United States Patent
Chiang (10) Patent No.: US 10,423,244 B2
(45) Date of Patent: Sep. 24, 2019

(54) CURSOR CONTROLLING DEVICE

(71) Applicants: LITE-ON ELECTRONICS (GUANGZHOU) LIMITED, Guangzhou (CN); LITE-ON TECHNOLOGY CORPORATION, Taipei (TW)

(72) Inventor: Hsiao-Lung Chiang, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 16/029,810

(22) Filed: Jul. 9, 2018

(65) Prior Publication Data

US 2019/0025948 A1    Jan. 24, 2019

(30) Foreign Application Priority Data

Jul. 24, 2017    (CN) .......................... 2017 1 0606262

(51) Int. Cl.
*G06F 3/0354*    (2013.01)
*G06F 3/0338*    (2013.01)

(52) U.S. Cl.
CPC ........ *G06F 3/03543* (2013.01); *G06F 3/0338* (2013.01); *G06F 2203/0332* (2013.01)

(58) Field of Classification Search
CPC .............. G06F 3/03543; G06F 3/0338; G06F 2203/0332
See application file for complete search history.

(56) References Cited

U.S. PATENT DOCUMENTS

2006/0022944 A1    2/2006 Pai

FOREIGN PATENT DOCUMENTS

TW    201614438 A    4/2016

*Primary Examiner* — Abhishek Sarma
(74) *Attorney, Agent, or Firm* — Li & Cai Intellectual Property (USA) Office (57) ABSTRACT

A cursor controlling device includes a bottom board, a pivoting structure disposed on the bottom board, a shell, and an angle-adjusting structure disposed under the shell. The shell is rotatably connected to the pivoting structure along a longitudinal axis of the pivoting structure. A side edge of the shell is formed with a stepped structure. The stepped structure has a plurality of abutting surfaces having respective distances with respect to the bottom board. The angle-adjusting structure has a supporting portion movable on the bottom board to support one of the abutting surfaces of the stepped structure. Therefore, the supporting portion is configured to selectively support one of the abutting surfaces to lift up the side edge of the shell away from the bottom board in an inclined state, or to lower the side edge of the shell to approach the bottom board in another inclined state.

20 Claims, 12 Drawing Sheets

CURSOR CONTROLLING DEVICE

BACKGROUND OF THE INVENTION

1. Field of the Invention

The present disclosure is related to a cursor controlling device. In particular, the present disclosure relates to a device for controlling a computer cursor.

2. Description of Related Art

The cursor controlling device, for example, the common computer mouse, has been widely used to control the computer cursor. One good ergonomic cursor controlling device is thus important to reduce the repetitive strain injuries in the hand, wrist or arm caused by the prolonged use of a computer mouse.

When one user operates the computer mouse, the operating actions include holding the shell and clicking the button cap of a computer mouse. Because users' handedness is different, the right-handed palm and the left-handed palm have respective inclined angles. The common computer mouse usually has a shell which is fixed at one unchangeable angle, so that it cannot be adapted to different users. In addition, users' fingers each have different clicking forces, and the buttons of common computer mouse usually have the same clicking resistance, so that it cannot be adapted to different users.

SUMMARY OF THE INVENTION

One of the objectives of the present disclosure is to provide a cursor controlling device, which provides a shell capable of being adjusted to different inclined states, for fitting various users and conforming to more ergonomic demands.

In addition, another of the objectives of the present disclosure is to provide a cursor controlling device, which provides a button cap with an adjustable clicking force, for fitting various users and conforming to more ergonomic demands.

In order to achieve the above objectives, according to one exemplary embodiment of the present disclosure, a cursor controlling device is provided which has a bottom board, a pivoting structure disposed on the bottom board, a shell disposed above the bottom board, and an angle-adjusting structure disposed under the shell. The pivoting structure is defined with at least one longitudinal axis. The shell is rotatably connected to the pivoting structure along the longitudinal axis, such that an inclined angle of the shell is adjustable. A side edge of the shell is formed with a stepped structure. The stepped structure has a plurality of abutting surfaces which have respective distances with respect to the bottom board. The angle-adjusting structure has a supporting portion, and the supporting portion is movable along the bottom board and located on one of the abutting surfaces of the stepped structure. Therefore, the supporting portion is configured to selectively support one of the abutting surfaces to lift up the side edge of the shell away from the bottom board in an inclined state, or to lower the side edge of the shell to approach the bottom board in another inclined state.

According to one embodiment of the present disclosure, the cursor controlling device further includes a supporting board, a mounting rack, and a switch. The supporting board is disposed above the shell along a pivoting axis in a pushable condition. The mounting rack is disposed on the bottom surface of the supporting board. The switch is received in the mounting rack. The switch is configured to be movably located on different positions on the bottom surface of the supporting board, to adjust a distance between the switch and the pivoting axis for changing a lever arm of the switch during an action of clicking.

In order to achieve the above objectives, according to another embodiment of the present disclosure, a cursor controlling device is provided, which includes a bottom board, a shell, a supporting board, a mounting rack and a switch. The shell is disposed above the bottom board. The supporting board is disposed above the shell along a pivoting axis in a pushable condition. The mounting rack is disposed on a bottom surface of the supporting board. The switch is received in the mounting rack. The switch is configured to be movably located on different positions on the bottom surface of the supporting board, to adjust a distance between the switch and the pivoting axis for changing a lever arm of the switch during an action of clicking.

Thus, the present disclosure has the advantages as follows. The cursor controlling device of the present disclosure, such as one computer mouse, provides the shell which is capable of being adjusted to different inclined states, and the clicking force of the button cap is adjustable, for fitting various users and conforming to more ergonomic demands.

For further understanding of the present disclosure, reference is made to the following detailed description illustrating the embodiments and examples of the present disclosure. The description is for illustrative purpose only and is not intended to limit the scope of the claim.

DETAILED DESCRIPTION OF THE EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 1:
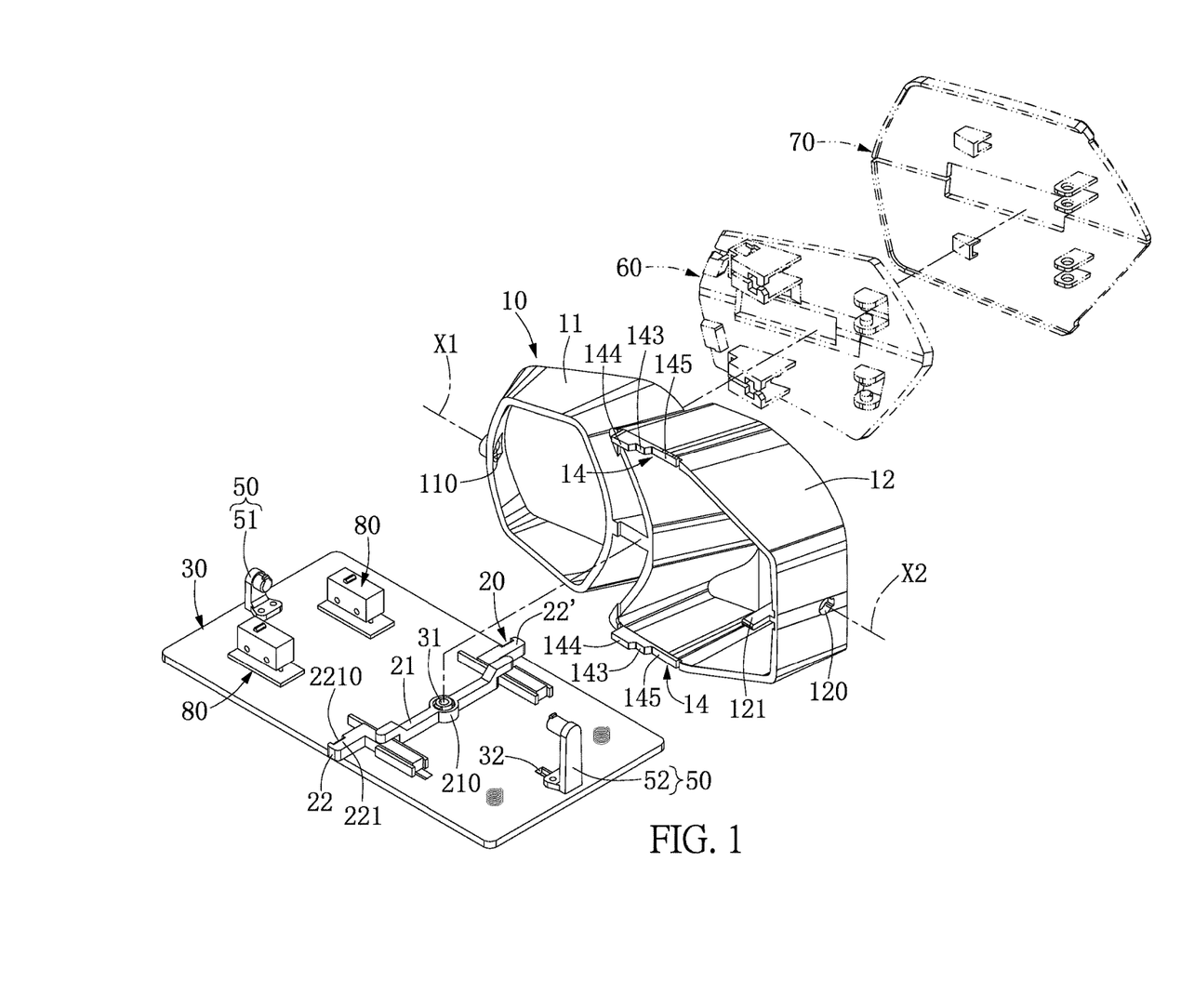
FIG. 1 is an exploded perspective view of a cursor controlling device of the present disclosure.

Reference is made to FIG. 1, which is an exploded view of a cursor controlling device according to the present disclosure. The cursor controlling device of the present disclosure can be applied in, such as a computer mouse, but it is not limited thereto. The cursor controlling device includes a shell 10, an angle-adjusting structure 20, a bottom board 30 and a pivoting structure 50. The pivoting structure 50 is disposed on the bottom board 30 and is formed with at least a longitudinal axis, such as the line X1 or X2 in FIG. 1. The shell 10 is disposed above the bottom board 30, and the shell 10 is rotatably connected to the pivoting structure 50 along the longitudinal axis, such as the line X1 or X2 in FIG. 1. Therefore, the roll angle or inclined angle of the shell 10 can be adjusted. The shell 10 has two sides which are respectively formed with a stepped structure 14 on a bottom edge thereof. The stepped structure 14 has a plurality of abutting surfaces 143, 144, 145 which have respective distances with respect to the bottom board 30. The angle-adjusting structure 20 is disposed under the shell 10. The angle-adjusting structure 20 has a supporting portion 221 which is movable along the bottom board 30 to produce a displacement and is located on one of the abutting surfaces 143, 144, 145 on the stepped structure 14.

Figure 4:
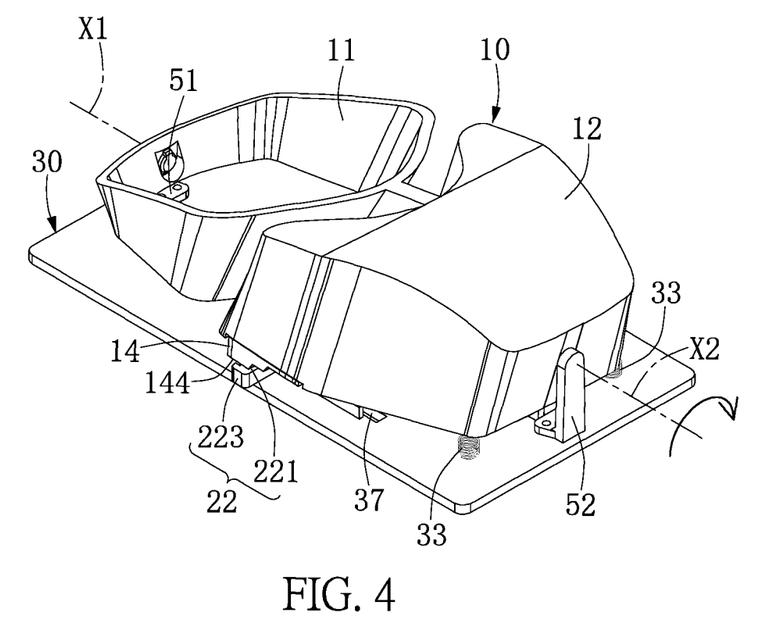
FIG. 4 is a perspective view of the cursor controlling device slanting to the right of the present disclosure.
Figure 4A:
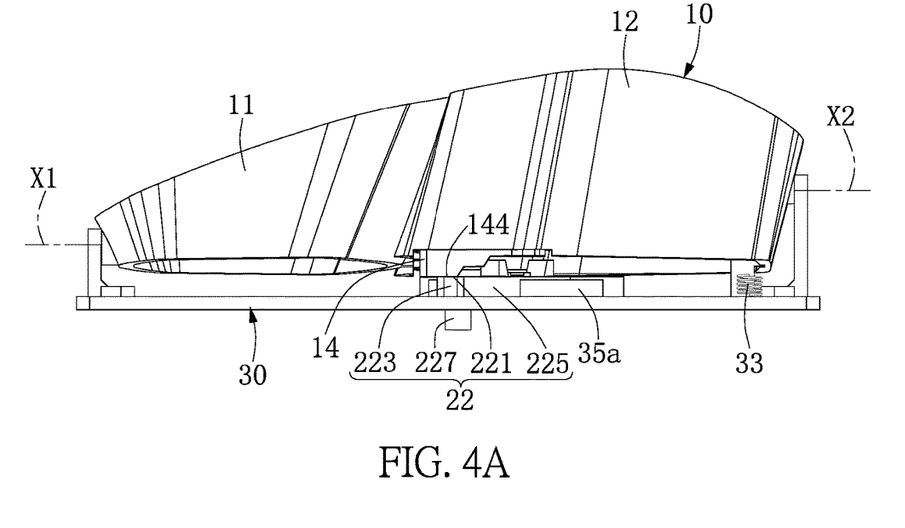
FIG. 4A is a side view of FIG. 4 of the present disclosure.
Figure 5:
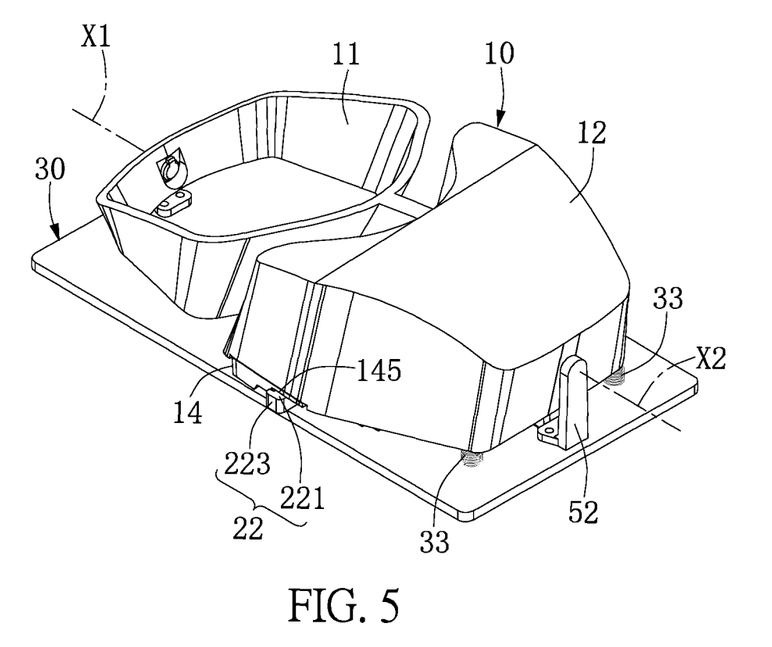
FIG. 5 is a perspective view of the cursor controlling device slanting to the left of the present disclosure.
Figure 5A:
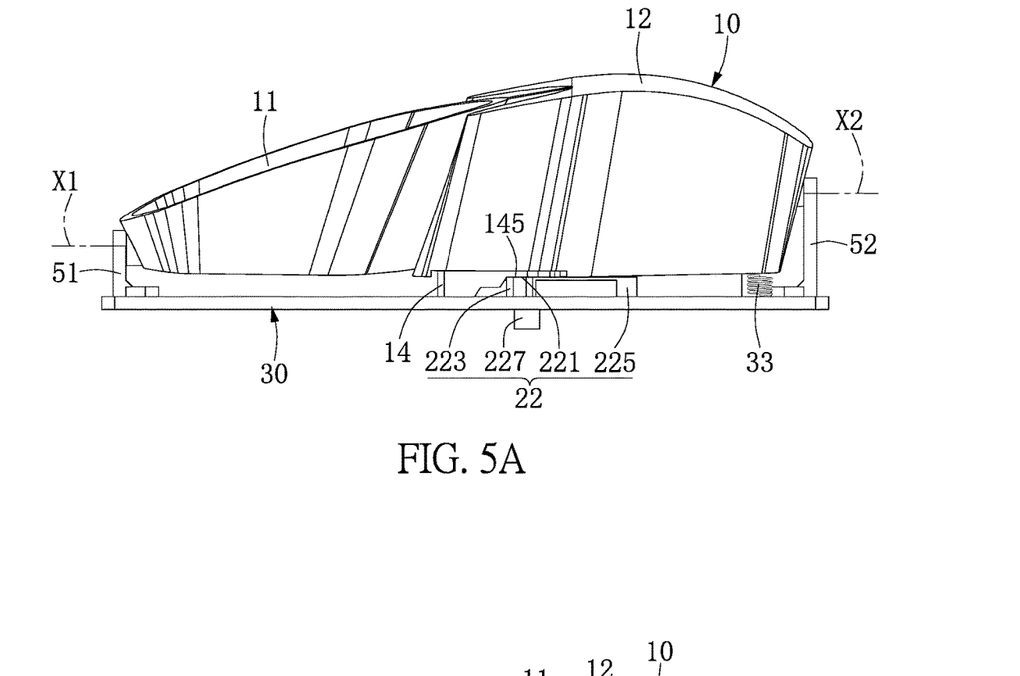
FIG. 5A is a side view according to FIG. 5 of the present disclosure.

By virtue of the above structure design this embodiment has the advantages as follows. The supporting portion 221 is configured to support one of the abutting surfaces 143, 144, 145, so as to lift up the side edge of the shell 10 away from the bottom board 30 for producing an inclined condition. As shown in FIG. 4, it also can lower the side edge of the shell 10 to approach the bottom board 30 to transform into another inclined condition as shown in FIG. 5. Therefore, user's palm can be rested on the shell 10 of the cursor controlling device of the present disclosure, and the shell 10 can be adjusted to roll left or right, so as to adapt for different users' requirements and can be a design in accordance with ergonomic demands. For example, a left-handed person, or a right-handed person. Following is to introduce the embodiments of this embodiment in detail.

In this embodiment, the stepped structures 14 at two sides are identical, and respectively have three abutting surfaces, which are a low-leveled abutting surface 144, a middle-leveled abutting surface 143 and a high-leveled abutting surface 145, from a front end to a rear end of the cursor controlling device. However, the number of the abutting surfaces is not limited thereto.

The angle-adjusting structure 20 includes a cross bar 21 and a pair of operating bars 22, 22' which are respectively connected to two ends of the cross bar 21. The cross bar 21 is rotatably disposed on the bottom board 30 along an axis perpendicularly passing through the bottom board 30. In this embodiment, a central portion of the cross bar 21 is formed with a sleeve portion 210. The bottom board 30 has a bearing support 31, and the sleeve portion 210 is rotatably sleeved around the bearing support 31.

The supporting portion 221 is connected to one end of the cross bar 21. In particular, each of the operating bars 22, 22' has one supporting portion 221.

Figure 2:
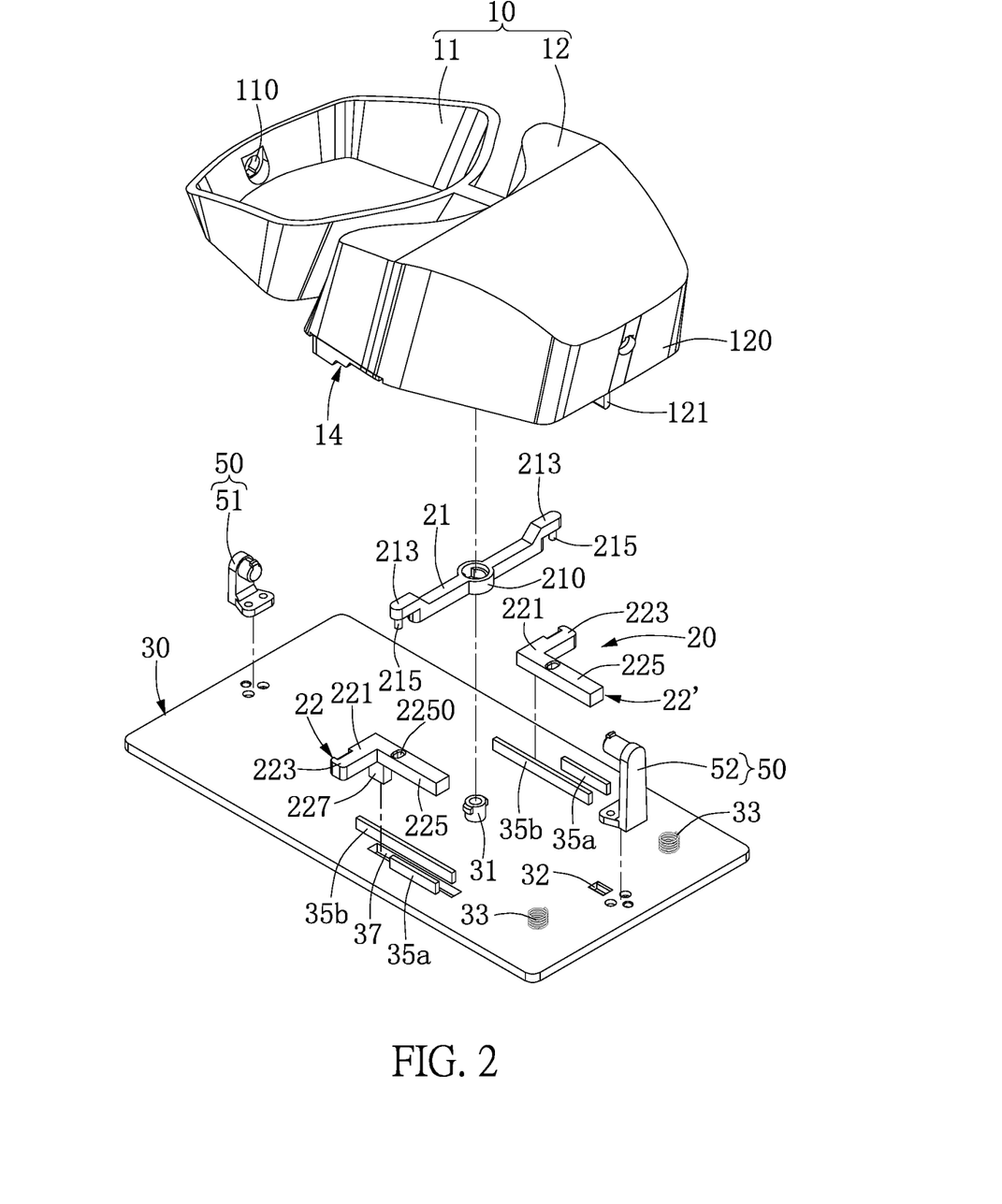
FIG. 2 is another exploded perspective view of the cursor controlling device of the present disclosure.

Reference is made to FIG. 2. For the convenience of making the user to adjust the roll angle of the shell 10, the angle-adjusting structure 20 further includes a lateral shifting lever 223 which is connected to the supporting portion 221. The lateral shifting lever 223 has one end which is exposed beyond one side of the shell 10. Therefore, the user can push the lateral shifting lever 223 from the right side or the left side of the cursor controlling device to abut against one of the abutting surfaces 143, 144, 145, and one of the abutting surfaces 143, 144, 145 of the stepped structure 14 is supported.

Reference is made with FIG. 2. This embodiment can change the position of the shifting lever. The angle-adjusting structure 20 includes a bottom shifting lever 227 which is connected to the supporting portion 221. The bottom board 30 is formed with a guiding slot 37. One end of the bottom shifting lever 227 is movably disposed in the guiding slot 37, and exposed to the bottom surface of the bottom board 30. Therefore, from the bottom surface of the cursor controlling device, the user can push the lateral shifting lever 223 to different positions corresponding to the abutting surfaces 143, 144, 145, so as to support one of the abutting surfaces 143, 144, 145 of the stepped structure 14. The present disclosure can be only equipped with the lateral shifting lever 223, or the bottom shifting lever 227, or both of the lateral shifting lever 223 and the bottom shifting lever 227. When the cursor controlling device only has the bottom shifting lever 227, the lateral shifting lever 223 can be omitted, and the side appearance of the cursor controlling device can present a simple look. In this embodiment, the bottom shifting lever 227 is limited by the guiding slot 37 of the bottom board 30, such that the rotating range of the angle-adjusting structure 20 also can be limited.

To guide the shifting lever properly and more smoothly, the angle-adjusting structure 20 further includes a sliding arm 225 which is connected to the supporting portion 221. The top surface of the bottom board 30 further includes a pair of guiding rails 35a, 35b. The sliding arm 225 is movably disposed between the guiding rails 35a, 35b, such that the sliding direction of the sliding arm 225 can be properly guided. However, the present disclosure is not limited thereto. For example, two sides of the bottom board 30 can only have one guiding rail 35a or one guiding rail 35b, which also has the same effect.

To sum up, in this embodiment, as shown in FIG. 2, the operating bar 22 at left side includes the lateral shifting lever 223, the sliding arm 225 and the bottom shifting lever 227. The lateral shifting lever 223 is connected to the sliding arm 225, which is substantially L-shaped. The bottom shifting lever 227 is connected to an inner end bottom of the lateral shifting lever 223. The supporting portion 221 is formed on the top surface of the lateral shifting lever 223. As shown in FIG. 1, the supporting portion 221 further includes a restricting cutout 2210 which is used to assist the stepped structure 14 of the shell 10 to be positioned on the supporting portion 221. The left operating bar 22' includes the lateral shifting lever 223 and the sliding arm 225 which is connected to the lateral shifting lever 223. The top side of the sliding arm 225 is formed with a shaft hole 2250. Two ends of the cross bar 21 have respectively a connecting portion 213 extending upward therefrom. The connecting portion 213 has a connecting shaft 215 protruded downward from a bottom thereof. The connecting shaft 215 is inserted into the shaft hole 2250.

In this embodiment, the angle-adjusting structure 20 is substantially H-shaped and is disposed on the bottom board 30, which has a height about equal to the height of the cross bar 21. The total height is low and does not excessively occupy the inner surface of the cursor controlling device. In addition, the structure is simple and is easy to be assembled.

Reference is made to FIG. 1 and FIG. 2. The pivoting structure 50 includes a front pivotal axle 51 and a rear pivotal axle 52, and both are fixed on the bottom board 30. A front end of the shell 10 is pivotally connected to the front pivotal axle 51, and a rear end of the shell 10 is pivotally connected to the rear pivotal axle 52. In this embodiment, the shell 10 has a front shell 11 and a rear shell 12 which is connected to the front shell 11. The front shell 11 is formed with a front axial hole 110 to connect the front pivotal axle 51. The rear shell 12 is formed with a rear axial hole 120 to connect the rear pivotal axle 52.

The present disclosure can adopt another pivoting manner. For example, one end adopts the pivoting structure as described above, and the other end uses a protruded part on the shell 10 to insert in the bottom board 30, so that the shell also can be inclined right or left. As shown in FIG. 1 and FIG. 2, the pivoting structure 50 can include a limiting hole 32 formed on the bottom board 30, and the shell 10 has an anti-sliding protrusion 121 protruded downward from a rear end thereof. The anti-sliding protrusion 121 is disposed in the limiting hole 32. The above-described partially-inserted structure can cooperate with the front pivotal axle 51 on the front end of the bottom board 30, so that the shell 10 is configured to be an inclinable structure. The similar varied embodiment also can be adapted to that, the partially-inserted structure can be arranged on the front end of the shell 10, and the pivoting structure can be applied on the rear end of the shell 10.

The cursor controlling device can further include a pair of elastic elements 33 which are disposed on the bottom board 30. The elastic elements 33 support two sides of the shell 10, respectively. In this embodiment, the elastic elements 33 can be a compressible spring and abut against two sides of the rear shell 12 to support the shell 10 in a normal condition.

Figure 3:
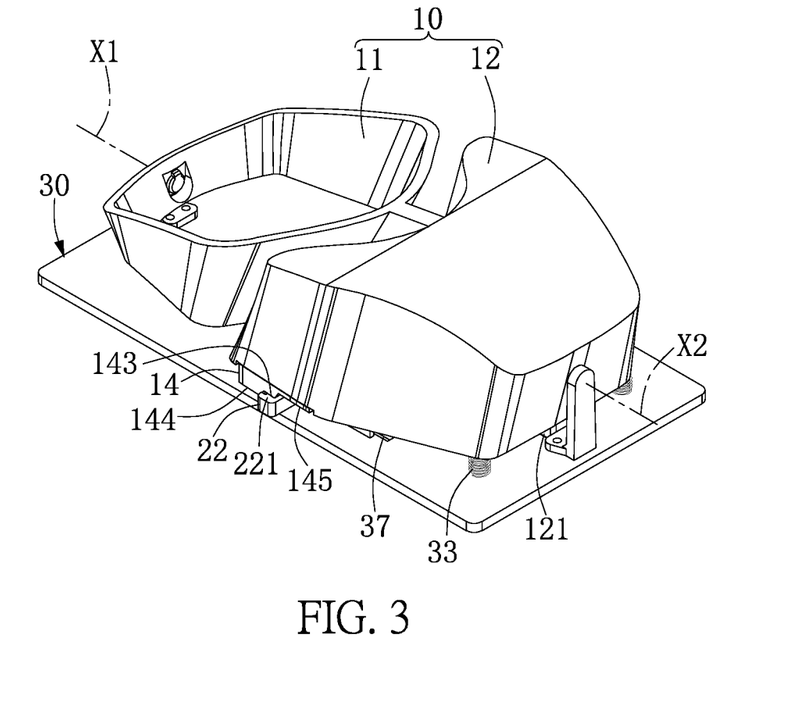
FIG. 3 is an assembled perspective view of the cursor controlling device of the present disclosure.
Figure 3A:
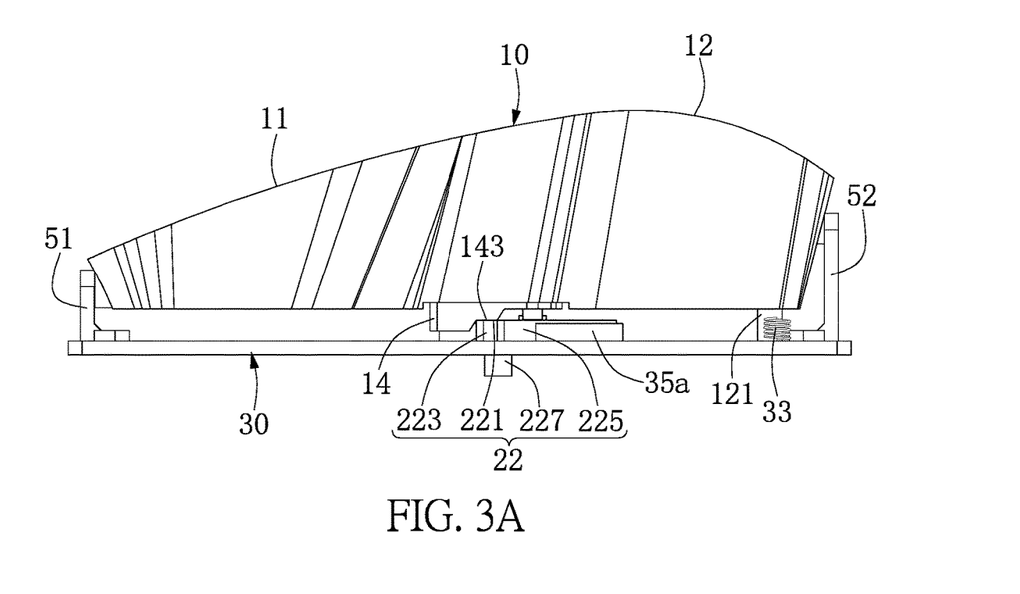
FIG. 3A is a side view according to FIG. 3 of the present disclosure.
Figure 3B:
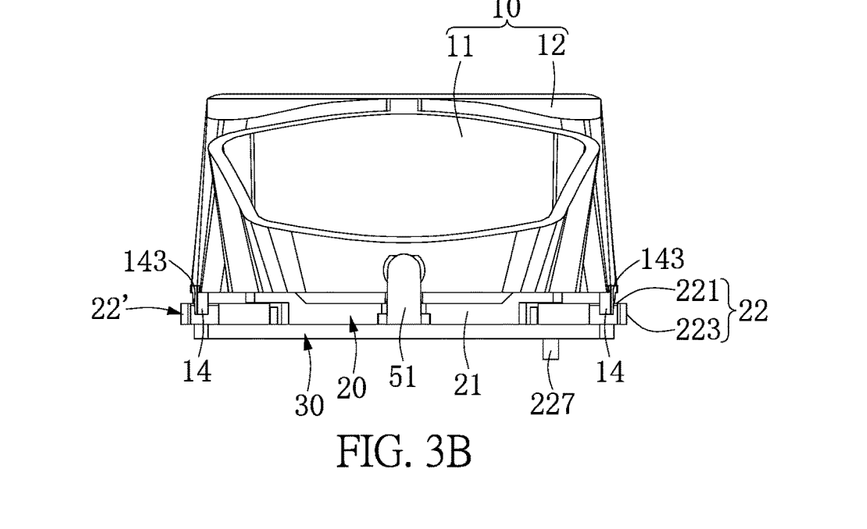
FIG. 3B is a front view according to FIG. 3 of the present disclosure.

The assembled view of this embodiment can refer to FIG. 3, FIG. 3A and FIG. 3B, which are an assembled perspective view, a side view, and a front view of the present disclosure. In the condition of FIG. 3, the supporting portion 221 of the operating bar 22 is abutted against the middle abutting surface 143. In other words, the stepped structures 14 at two sides of the shell 10 are rested on the operating bars 22, 22' at two sides of the angle-adjusting structure 20 on the same level. Therefore, the shell 10 is not inclined toward any side.

Figure 4B:
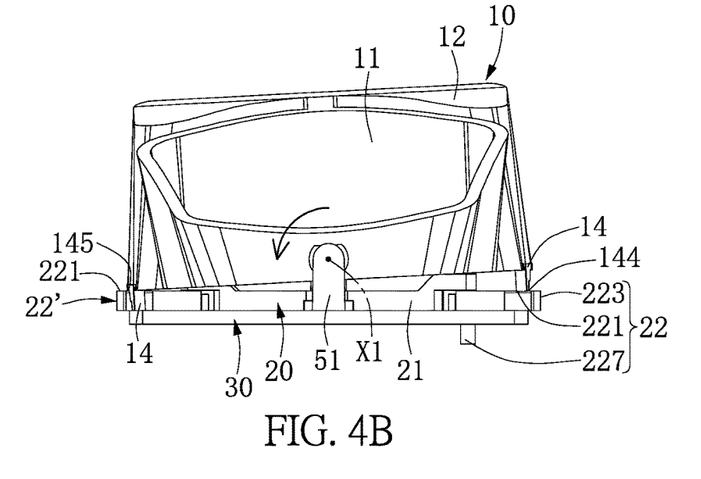
FIG. 4B is a main view according to FIG. 4 of the present disclosure.

Reference is made to FIG. 4 to FIG. 4B, which show the cursor controlling device in a second inclined state. As shown in FIG. 4, the operating bar 22 at the left side is moved forward, and the operating bar 22' at the right side is moved rearward correspondingly. The supporting portion 221 at the left side is abutted against the lower abutting surface 144 of the stepped structure 14 at the left side. The right supporting portion 221 of the operating bar 22', which is shown at the left side in FIG. 4B, is abutted against the higher abutting surface 145 (refer to FIG. 1) of the right stepped structure 14 on a higher level. Therefore, according to the front view thereof, the shell 10 is rotated counterclockwise in an inclined state. For example, it is suitable for right-handed users.

Figure 5B:
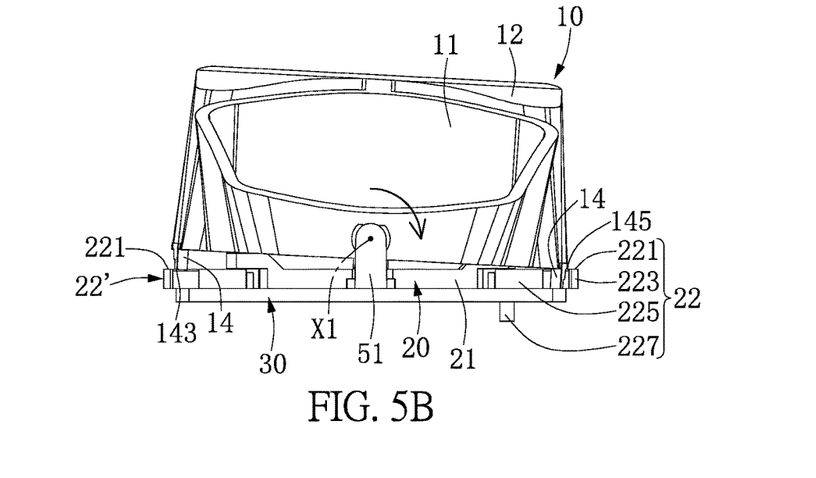
FIG. 5B is a front view according to FIG. 5 of the present disclosure.

Reference is made to FIG. 5 to FIG. 5B, which show the cursor controlling device in a third inclined state. As shown in FIG. 5, the operating bar 22 at the left side is moved rearward, and the operating bar 22' at the right side is moved forward correspondingly. The supporting portion 221 at the left side is abutted against the higher abutting surface 145 of the stepped structure 14 at the left side. The right supporting portion 221 of the operating bar 22', which is shown at the left side in FIG. 5B, is abutted against the lower abutting surface 143 (refer to FIG. 1) of the stepped structure 14 on a lower level. Therefore, according to the front view thereof, the shell 10 is rotated clockwise in an inclined state. For example, it is suitable for left-handed users.

Figure 6:
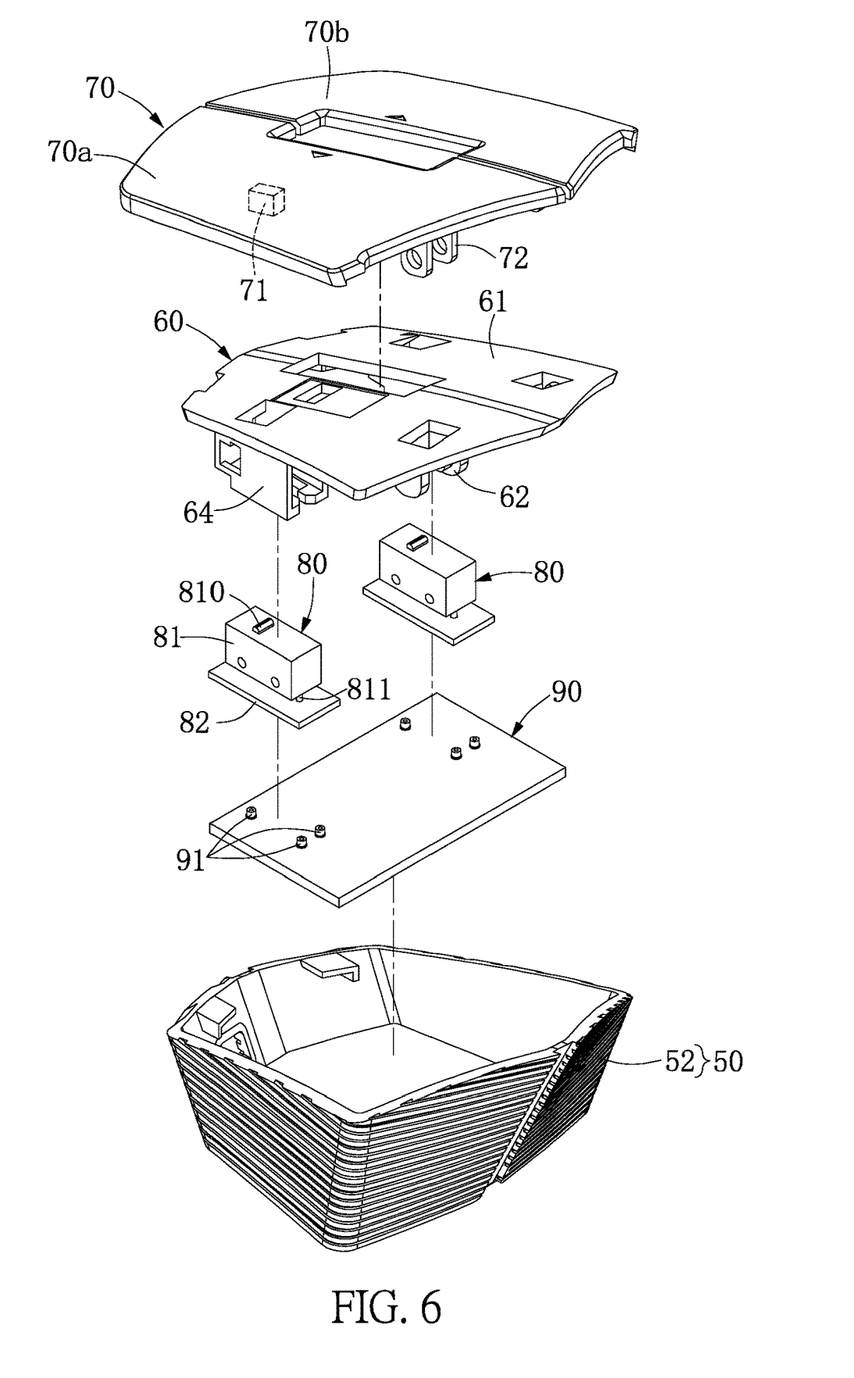
FIG. 6 is an exploded perspective view of a front portion of the cursor controlling device of the present disclosure.
Figure 7:
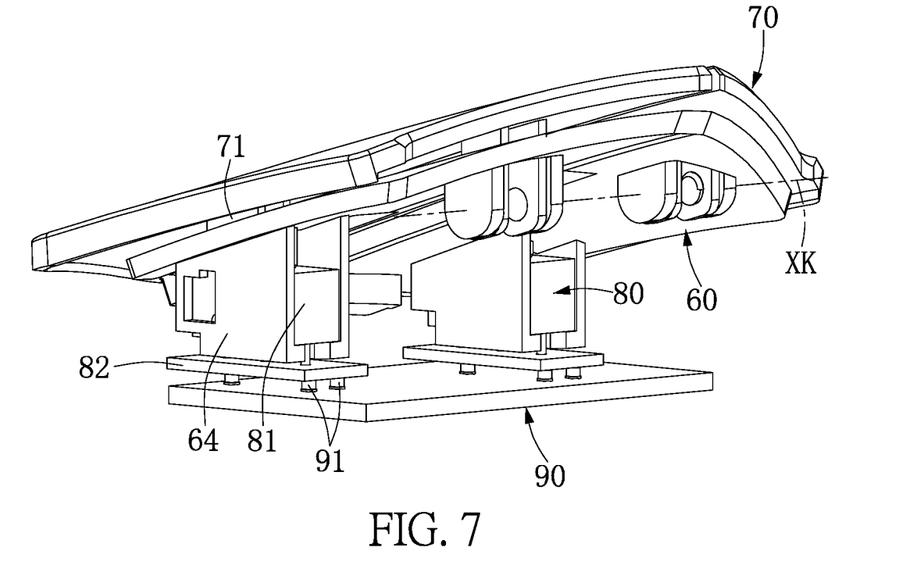
FIG. 7 is an assembled perspective view of the front portion of the cursor controlling device of the present disclosure.
Figure 8:
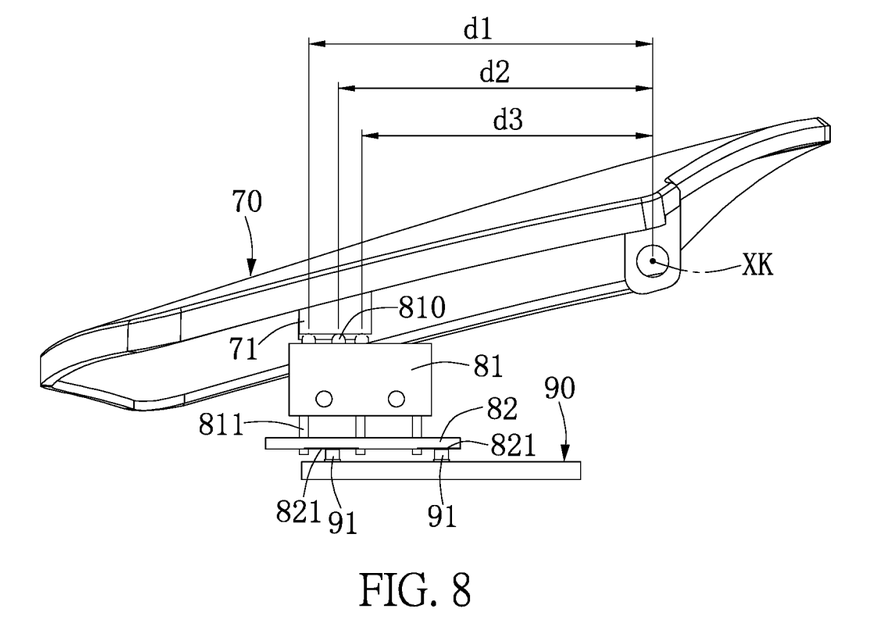
FIG. 8 is a partial side view of the front portion of the cursor controlling device of the present disclosure.

Reference is made to FIG. 6 and FIG. 8. In this embodiment, the cursor controlling device further includes a supporting board 60, a pair of mounting racks 64, a button cap 70 and two switches 81. The supporting board 60 is disposed above the shell 10 along a pivoting axis XK in a pushable condition. The button cap 70 is disposed above the supporting board 60 along the pivoting axis XK in a pushable manner. The button cap 70 has a pressing post 71 and a first pivotal portion 72. The supporting board 60 has a board body 61 and a second pivotal portion 62 disposed on a bottom surface of the board body 61. The first pivotal portion 72 and the second pivotal portion 62 are arranged on the pivoting axis XK. The mounting rack 64 is disposed on the bottom surface of the supporting board 60. A switch 81 is received in the mounting rack 64, and is adjustably located on different positions of the bottom surface of the supporting board 60. Therefore, a distance between the switch 81 and the pivoting axis XK is adjustable, in other words, that is the distance between the trigger portion 810 of the switch 81 and the pivoting axis XK. As shown in FIG. 8, a lever arm of the switch 81 is changeable, and the three lever arms d1, d2, d3 have different lengths. Therefore, according to this embodiment, the buttons 70a, 70b of the cursor controlling device can provide different clicking forces, so as to adapt to various users' clicking habits.

This embodiment includes a circuit board 90 which is fixed in the shell 10. The circuit board 90 has a plurality of contacting portions 91. The switch 81 has a plurality of leads 811 which are soldered to an adapting board 82. The switch 81 and the adapting board 82 are configured to be a switch module 80. The bottom surface of the adapting board 82 has a plurality of adapting contacts 821 which are electrically connected to the leads 811. In this embodiment, reference is made with FIG. 8; when the switch 81 is adjusted to another position, the adapting contacts 821 are continuously abutted against the contacting portions 91 correspondingly.

In detail, the contacting portions 91 in this embodiment can be extended, so that the adapting contacts 821 can continuously contact with the corresponding contacting portions 91. The adapting contacts 821 can be designed to elastically contact with the contacting portions 91. In addition, the contacting portions 91 and the adapting contacts 821 are interchangeable.

Figure 9:
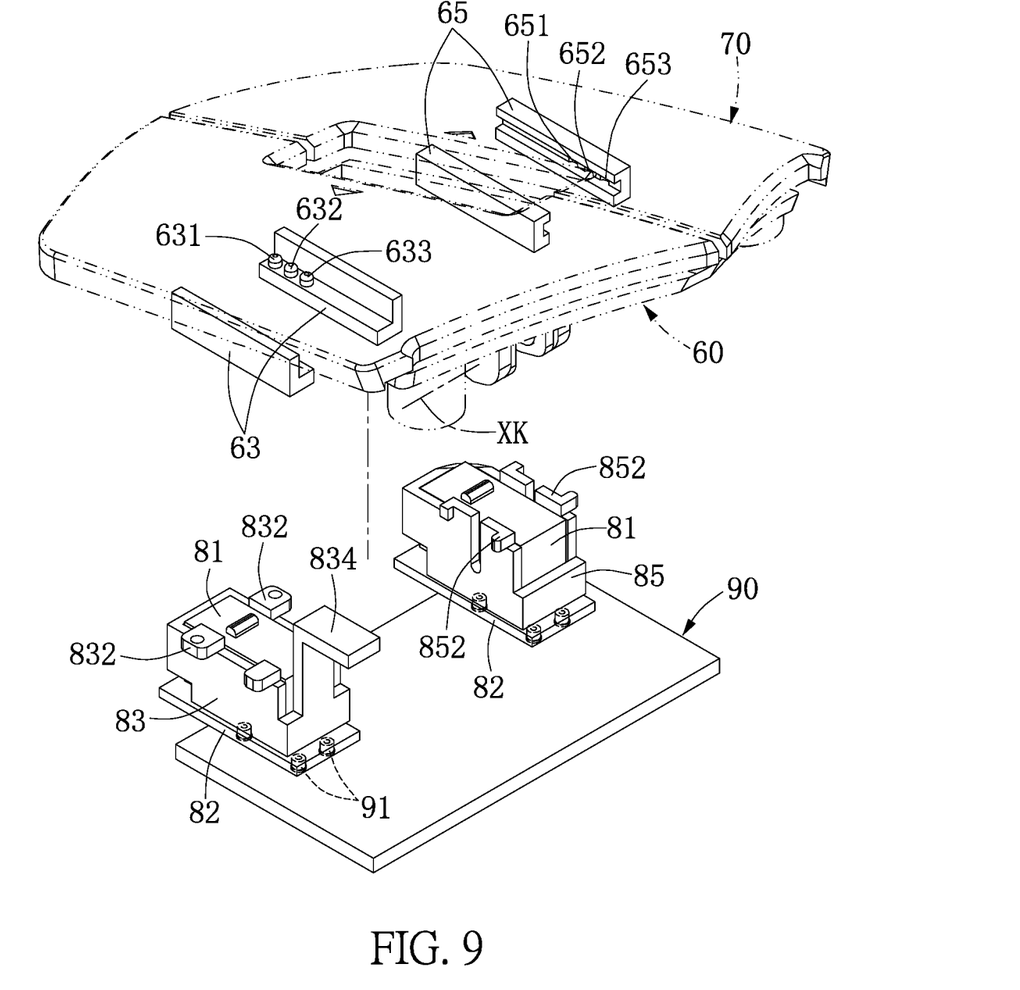
FIG. 9 is an exploded perspective view of the cursor controlling device of another embodiment of the present disclosure.

Reference is made with FIG. 9. Concerning fixing the switch 81 at different positions on the bottom surface of the supporting board 60, some examples are taken as follows. As shown in FIG. 9, the bottom surface of the supporting board 60 has two different kinds of positioning structure. The positioning structure at left side has a plurality of positioning portions (such as the reference numerals 631, 632, 633). The positioning structure at right side has a plurality of positioning portions (such as the reference numerals 651, 652, 653). An inferential note is that, in this embodiment, the cursor controlling device can be equipped with two identical positioning structures. The switch 81 is selectively fixed to one of the positioning portions. When the switch 81 is adjusted to another positioning portion, the adapting contacts 821 are continuously contacted with the contacting portions 91, correspondingly.

As shown in the left side of FIG. 9, one kind of positioning structure in this embodiment is provided. The supporting board 60 has a pair of sleeved-type locating rails 63, and the sleeve-type locating rail 63 has a plurality of positioning rods 631, 632, 633. In this embodiment, the mounting rack is a sleeved-type mounting rack 83, which means that the sleeved-type mounting rack 83 is movably connected to the sleeved-type locating rail 63 in a sleeved manner. The sleeved-type mounting rack 83 has a fixing tab 832, and the fixing tab 832 is selectively sleeved around one of the positioning rods 631, 632, 633. This movable sleeved-type mounting rack 83 further provides a holding portion 834, such that the user can conveniently hold and move the sleeved-type mounting rack 83. By moving the sleeved-type mounting rack 83, the switch 81 can be moved to different positions of the bottom surface of the supporting board 60.

As shown in the right side of FIG. 9, one kind of positioning structure in this embodiment is provided. The supporting board 60 has a pair of engaged-type locating rails 65. Each engaged-type locating rail 65 has a plurality of positioning recesses 651, 652, 653. In this embodiment, the mounting rack is an engaged-type mounting rack 85, which means that the engaged-type mounting rack 85 is movably connected to the engaged-type locating rail 65 in an engaging manner. The engaged-type mounting rack 85 has a fixing tab 852, and the fixing tab 852 is selectively engaged to one of the positioning recesses 651, 652, 653. By moving the engaged-type mounting rack 85, the switch 81 can be moved to different positions of the bottom surface of the supporting board 60.

According to this embodiment, the switch 81 is designed that, the clicking force of the button cap 70a, 70b of the cursor controlling device is adjustable by moving the position of the switch 81, which is suitable for various user's clicking habits. In addition, the switch 81 is replaceable when it is under fault condition, or can be replaced by one switch with a different sensitivity, for example.

The cursor controlling device of the present disclosure, such as computer mouse, has the characteristics and functions that, the shell can be adjusted to different inclined states, and the clicking force of the button cap is adjustable, for fitting various users and conforming to more ergonomic demands.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A cursor controlling device, comprising:
 a bottom board;
 a pivoting structure, disposed on the bottom board, defined with at least one longitudinal axis;
 a shell, disposed above the bottom board, wherein the shell is rotatably connected to the pivoting structure along the longitudinal axis, a side edge of the shell formed with a stepped structure, the stepped structure having a plurality of abutting surfaces which have respective distances with respect to the bottom board; and
 an angle-adjusting structure, disposed under the shell, wherein the angle-adjusting structure has a supporting portion, and the supporting portion is movable along the bottom board and located on one of the abutting surfaces on the stepped structure;
 such that the supporting portion is configured to selectively support one of the abutting surfaces to lift up the side edge of the shell away from the bottom board in an inclined state, or to lower the side edge of the shell to approach the bottom board in another inclined state.

2. The cursor controlling device as claimed in claim 1, wherein the angle-adjusting structure includes a cross bar, and the cross bar is rotatably disposed on the bottom board along an axis perpendicularly passing through the bottom board, wherein the supporting portion is connected to one end of the cross bar.

3. The cursor controlling device as claimed in claim 2, wherein a central portion of the cross bar is formed with a sleeve portion, and the bottom board has a bearing support, the sleeve portion being rotatably sleeved around the bearing support.

4. The cursor controlling device as claimed in claim 1, wherein the angle-adjusting structure further comprises a lateral shifting lever connected to the supporting portion, and one end of the lateral shifting lever is exposed beyond one side of the shell.

5. The cursor controlling device as claimed in claim 1, wherein the angle-adjusting structure further comprises a bottom shifting lever connected to the supporting portion; wherein the bottom board is formed with a guiding slot, and one end of the bottom shifting lever is movably disposed in the guiding slot and exposed to a bottom surface of the bottom board.

6. The cursor controlling device as claimed in claim 1, wherein the angle-adjusting structure further comprises a sliding arm connected to the supporting portion, wherein a top surface of the bottom board further comprises a guiding rail, and the sliding arm is movably abutted against the guiding rail.

7. The cursor controlling device as claimed in claim 1, wherein the pivoting structure includes a front pivotal axle fixed on the bottom board, and a rear pivotal axle fixed on the bottom board, wherein a front end of the shell is pivotally connected to the front pivotal axle, and a rear end of the shell is pivotally connected to the rear pivotal axle.

8. The cursor controlling device as claimed in claim 7, wherein the shell has a front shell and a rear shell connected to the front shell, wherein the front shell is formed with a front axial hole connected with the front pivotal axle, and the rear shell is formed with a rear axial hole connected with the rear pivotal axle.

9. The cursor controlling device as claimed in claim 1, wherein the pivoting structure further includes a limiting hole formed on the bottom board, wherein the shell has an anti-sliding protrusion protruded downward from a rear end thereof, and the anti-sliding protrusion is disposed in the limiting hole.

10. The cursor controlling device as claimed in claim 1, further comprising a pair of elastic elements disposed on the bottom board, and the elastic elements respectively support two sides of the shell.

11. The cursor controlling device as claimed in claim 1, further comprising a supporting board, a mounting rack, and a switch, wherein the supporting board is disposed above the shell along a pivoting axis in a pushable condition, wherein the mounting rack is disposed on the bottom surface of the supporting board, wherein the switch is received in the mounting rack, wherein the switch is configured to be movably located on different positions on the bottom surface of the supporting board, to adjust a distance between the switch and the pivoting axis for changing a lever arm of the switch during an action of clicking.

12. The cursor controlling device as claimed in claim 11, further comprising a button cap being disposed above the supporting board along the pivoting axis in a pushable manner.

13. The cursor controlling device as claimed in claim 11, further comprising a circuit board fixed in the shell, the circuit board having a plurality of contacting portions; wherein the switch has a plurality of leads soldered to an adapting board, and a bottom surface of the adapting board having a plurality of adapting contacts electrically connected to the lead; when the switch is adjusted to another position, the adapting contacts are continuously abutted against the contacting portions correspondingly.

14. The cursor controlling device as claimed in claim 11, wherein the supporting board has a pair of sleeved-type locating rails, and the sleeved-type locating rail has a plurality of positioning rods, wherein the mounting rack is a sleeved-type mounting rack, and the sleeved-type mounting rack is movably connected to the sleeved-type locating rail, the sleeved-type mounting rack having a fixing tab, the fixing tab being selectively sleeved around one of the positioning rods.

15. The cursor controlling device as claimed in claim 11, wherein the supporting board has a pair of engaged-type locating rails, and the engaged-type locating rail has a plurality of positioning recesses, wherein the mounting rack is an engaged-type mounting rack, and the engaged-type mounting rack is movably connected to the engaged-type locating rail, wherein the engaged-type mounting rack has a fixing tab, and the fixing tab is selectively engaged to one of the positioning recesses.

16. A cursor controlling device, comprising:
a bottom board;
a shell, disposed above the bottom board;
a supporting board, disposed above the shell along a pivoting axis in a pushable condition;
a mounting rack, disposed on a bottom surface of the supporting board; and
a switch, received in the mounting rack, wherein the switch is configured to be movably located on different positions on the bottom surface of the supporting board, to adjust a distance between the switch and the pivoting axis for changing a lever arm of the switch during an action of clicking.

17. The cursor controlling device as claimed in claim 16, further comprising a button cap being disposed above the supporting board along the pivoting axis in a pushable manner.

18. The cursor controlling device as claimed in claim 16, further comprising a circuit board fixed in the shell, the circuit board having a plurality of contacting portions; wherein the switch has a plurality of leads soldered to an adapting board, and a bottom surface of the adapting board having a plurality of adapting contacts electrically connected to the lead; when the switch is adjusted to another position, the adapting contacts are continuously abutted against the contacting portions correspondingly.

19. The cursor controlling device as claimed in claim 16, wherein the supporting board has a pair of sleeved-type locating rails, and the sleeved-type locating rail has a plurality of positioning rods, wherein the mounting rack is a sleeved-type mounting rack, and the sleeved-type mounting rack is movably connected to the sleeved-type locating rail, the sleeved-type mounting rack having a fixing tab, the fixing tab being selectively sleeved around one of the positioning rods.

20. The cursor controlling device as claimed in claim 16, the supporting board has a pair of engaged-type locating rails, and the engaged-type locating rail has a plurality of positioning recesses, wherein the mounting rack is an engaged-type mounting rack, and the engaged-type mounting rack is movably connected to the engaged-type locating rail, wherein the engaged-type mounting rack has a fixing tab, and the fixing tab is selectively engaged to one of the positioning recesses.

* * * * *